Dec. 20, 1949  A. A. SWEENY ET AL  2,491,591
TELEMETERING SYSTEM
Filed June 2, 1948  4 Sheets-Sheet 1

INVENTORS
A. A. SWEENY
M. F. SWEENY
BY Martin E Anderson
ATTORNEY

Dec. 20, 1949     A. A. SWEENY ET AL     2,491,591
TELEMETERING SYSTEM

Filed June 2, 1948     4 Sheets-Sheet 2

INVENTORS
A. A. SWEENY
M. F. SWEENY
BY
Maiton E. Anderson
ATTORNEY

TIME

Patented Dec. 20, 1949

2,491,591

UNITED STATES PATENT OFFICE 2,491,591

TELEMETERING SYSTEM

Alfred A. Sweeny, Denver, Colo., and Maurice F. Sweeny, Pittsburgh, Pa.

Application June 2, 1948, Serial No. 30,606

3 Claims. (Cl. 177—351)

1

This invention relates to improvements in telemetric systems of the type in which the angular position of a pointer passing over a calibrated dial can be reproduced with exactness on a similarly calibrated dial on the screen of a cathode ray oscilloscope.

It is the object of this invention to produce a simplified system of the type indicated that will require a minimum of apparatus and which can be readily adapted to transmit and indicate at the receiving station the positions of several pointers, on concentric scales.

A further object is to produce a system which may employ a metallic line, carrier current channel or space radio transmission.

The invention is intended for use in connection with power transmission networks having transformer stations at scattered points, spaced from the place where the load dispatcher is positioned and by means of which he will be constantly advised of the voltage and load conditions at such points.

The device or system may, however, be used in many other places and for other purposes, and the use in connection with which the invention is described is illustrative, only.

The above and other objects of this invention which will become apparent as the description proceeds, are attained by means of a construction and a combination of elements that will now be described, and for this purpose reference will be had to the accompanying drawings in which the invention has been illustrated, and in which.

Figure 1:
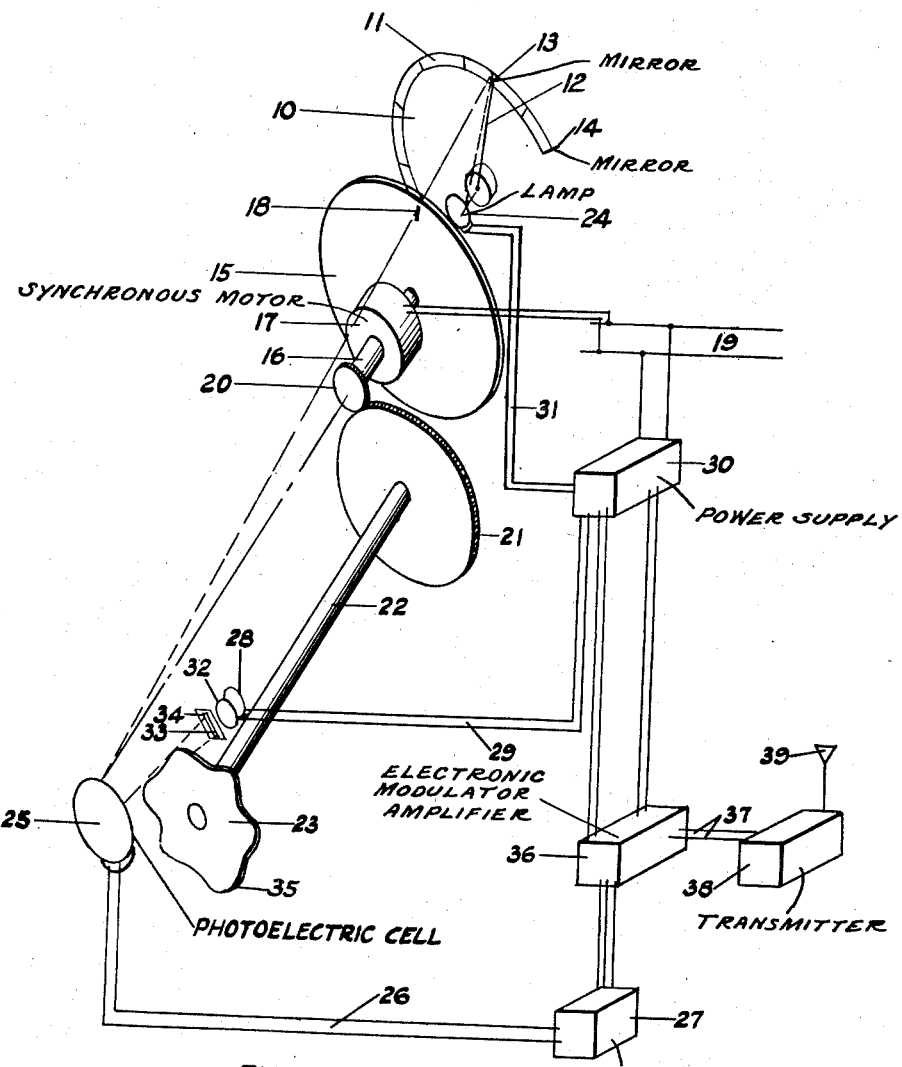
Figure 1 is a diagrammatic view showing the assemblage and relationship of the several elements comprising the sending apparatus arranged for the transmission of a single reading.

Referring now to the drawing, reference numeral 10 designates an indicating instrument, such as a voltmeter or ammeter, having a scale 11 and a pointer 12. A mirror 13 is secured to the pointer for a purpose that will presently appear. The instrument may also carry a synchronizing mirror 14. Disk 15 is mounted on shaft 16 of a motor 17. Disk 15 has a radial slot 18. Power for operating the motor may be derived from an alternating current line 19, which may be of any desired frequency, a direct current motor operating from a direct current line, or an alternating current motor operating from a 25 or 50 cycle line might be used as well. Secured to shaft 16 is a gear 20 that is in mesh with gear 21 secured to shaft 22. To the other end of shaft 22, a disk 23 is attached and this has a periphery that is notched or serrated as shown for a purpose that will later be pointed out.

Motor 17 will, for the purpose of this description, be considered as being a two-pole synchronous motor and since it is driven from a 60-cycle power supply, it will rotate sixty times per second. A four or six pole motor can be used with corresponding changes in speed.

In the embodiment illustrated, the ratio between gears 20 and 21 is as 6 is to 1; that is gear 20 must rotate six complete revolutions for each turn of gear 21 and the latter, therefore, turns ten times per second.

A lamp 24 is positioned between disk 15 and the instrument pointer 12 and illuminates the latter. Light striking mirror 13 is reflected and thrown upon the surface of disk 15 along the zone in which slot 18 rotates. A photoelectric cell 25 is positioned in line with the axis of shaft 16 and arranged so that once in each revolution of disk 15, light reflected from mirror 13 will pass through slot 18 and strike the photoelectric cell, thereby producing an instantaneous flow of current through circuit wires 26 to the cathode follower 27. Lamp 28 is operated from direct current delivered to it by circuit wires 29 that come from the power supply 30, from which circuit wires 31 extend to lamp 24. Light from lamp 28 passes through lense 32 and through a slit 33 in plate 34, onto the photoelectric cell 25. The beam of light from lamp 28 is so positioned and of such width that it covers a zone on disk 23 whose width equals the amplitude of the serrations 35 and therefore when disk 23 turns the amount of light striking the photoelectric cell 25 will vary in accordance with the shape and number of teeth or serrations 35. The shape of the teeth is such that the resultant current flow in circuit wires 26 will approximate a sine wave like that shown in Figure 4, where two sine waves of different amplitude have been shown. The shape of the sine wave will suffer an instantaneous distortion each time that light from mirror 13 strikes photoelectric cell 25. The current from photocell 25 after passing through cathode follower 27 will pass on to the electronic modulator amplifier 36 to the metallic line, or carrier channel or wireless transmission circuit 37. If wireless transmission is used, wires 37 connect with the transmitter 38 and modulate a radio frequency wave, the modulated radio frequency wave being sent from antennae 39. If carrier channel is used wires 37 connect to the transmitter which is connected through coupling capacitors to the power line.

Figure 2:
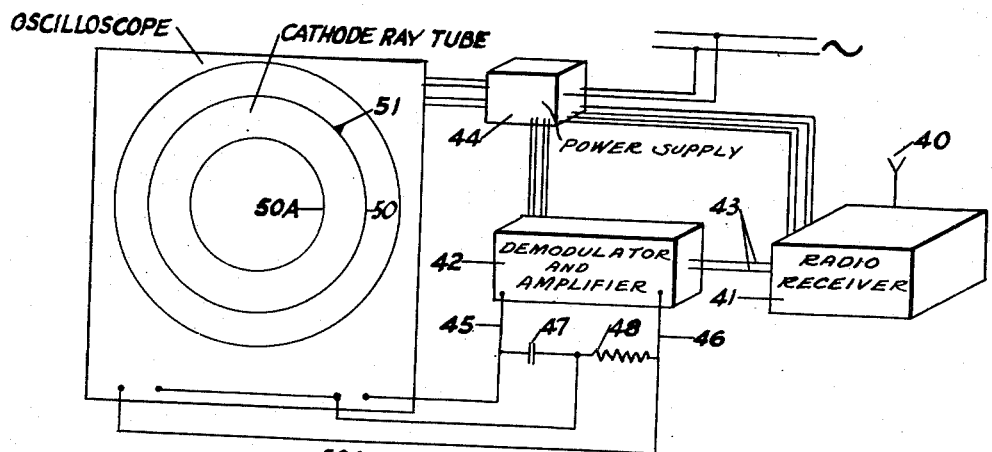
Figure 2 is a diagrammatic view showing the several elements of the receiving station.
Figure 2:
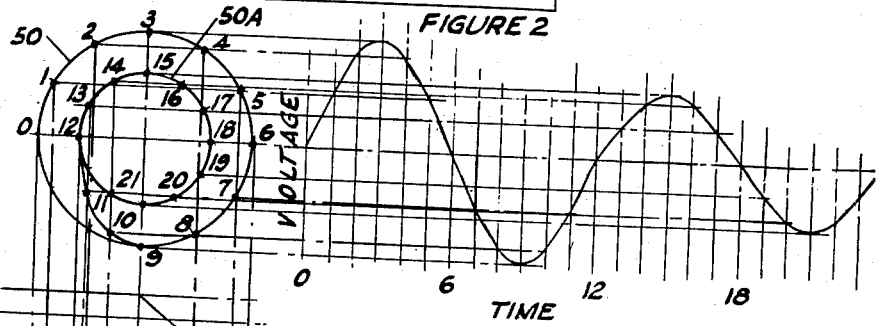

Referring now to Figure 2 and assuming that the wireless transmission is used, the waves will strike antennae 40 and enter the radio receiver 41 which is connected to demodulator and amplifier 42 by wires 43. The power supply 44 is connected with the radio receiver, the demodulator and the oscilloscope or cathode ray tube by circuits as shown. The modulated frequency wave is demodulated and a wave with distortions substantially the same as that from wires 37 reaches the oscilloscope by wires 45 and 46 that are interconnected by a condenser 47 and an impedance coil 48. Serrations 23 may be slightly modified to correct any variation from a sine wave due to the communication apparatus. A third wire 49 connects the point between the condenser and the impedance with the oscilloscope in the usual way, whereby the cathode ray will trace a circle 50 on the fluorescent screen of the tube. When the voltage is changed by light from mirror 13 striking photoelectric cell 25, the cathode ray will suffer a deviation producing a point 51 that indicates the position of pointer 12. The screen of the cathode tube may be provided with a graduated scale corresponding to scale 11 and point 51 will therefore indicate the correct position of pointer 12 and its reading.

When indications from a single instrument are to be transmitted, only a single locus of the cathode ray is necessary. When indications from a plurality of instruments are to be transmitted and received, certain changes must be made which will now be described.

Figure 5:
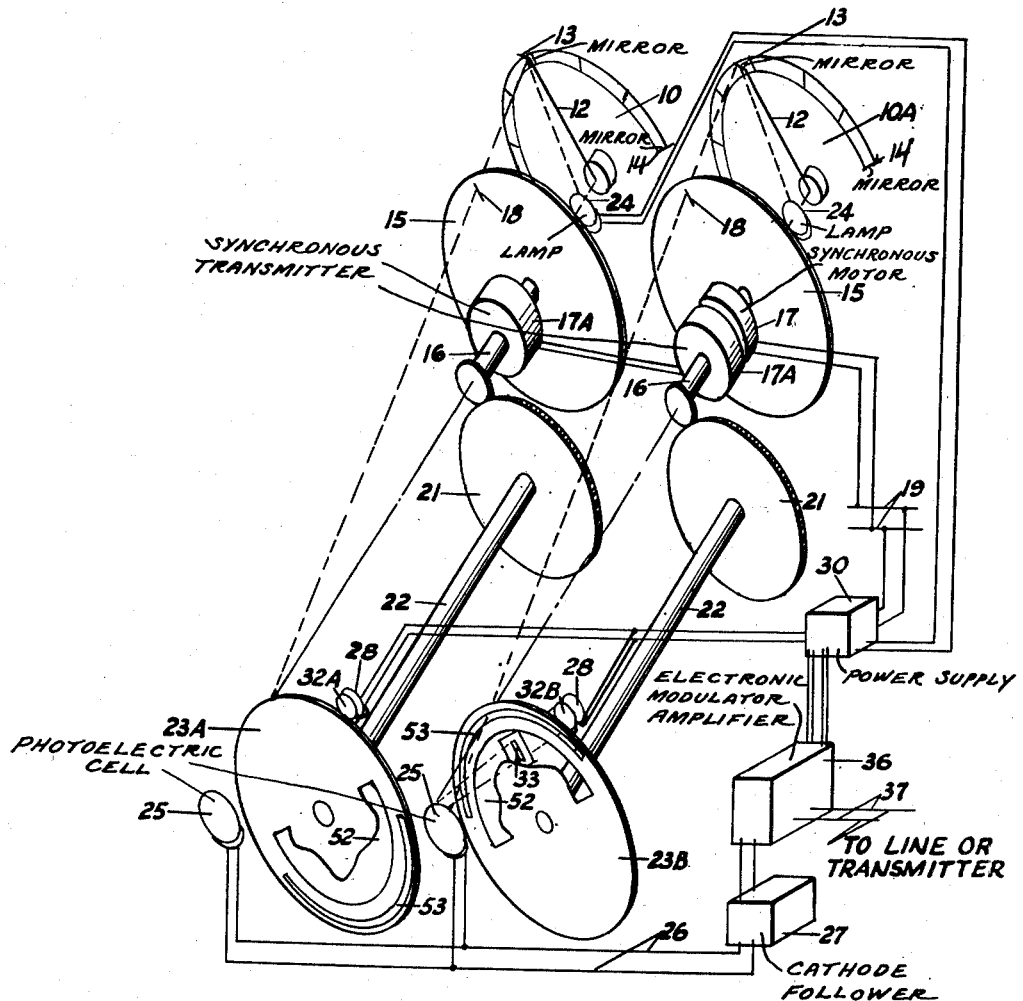
Figure 5 is a diagram similar to that shown in Figure 1, but arranged for the transmission of two readings.

Referring now to Figure 5, which shows the invention arranged for transmitting readings from two instruments 10 and 10A, it will be observed that the apparatus shown in Figure 1 and above described is, to some extent, duplicated. The parts that are identical with the parts shown in Figure 1 have been designated by the same reference numerals. When readings from two instruments like 10 and 10A are to be transmitted, disk 23 of Figure 1 is replaced by disks 23A and 23B, each of which has an arcuate opening 52 that extends through an angle of 180 degrees and an arcuate opening 53 which extends through slightly less than 180 degrees. The inner edge of each arcuate opening 52 is waved or serrated in such a manner that the light that strikes photoelectric cell 25 will produce an alternating sine wave voltage in circuit wires 26 as explained in connection with Figure 1. It will be observed that disks 23A and 23B are so arranged that when light passes through openings 52 and 53 in disk 23A it will not pass through the corresponding openings in disk 23B. Lamp 32B may be brighter than 32A or the serrations 35B may differ from 35A in such a manner that more light will pass through the opening in disk 23B than through the one in disk 23A with the result that the sine wave due to the variations of light passing through the opening in disk 23B will have a greater amplitude than that due to the light passing through opening 52 in disk 23A. The apparatus will, therefore, send in alternating succession a wave of different amplitude with the result that the cathode beam will trace two concentric circles on the fluorescent screen as shown in Figure 2.

Figure 3:
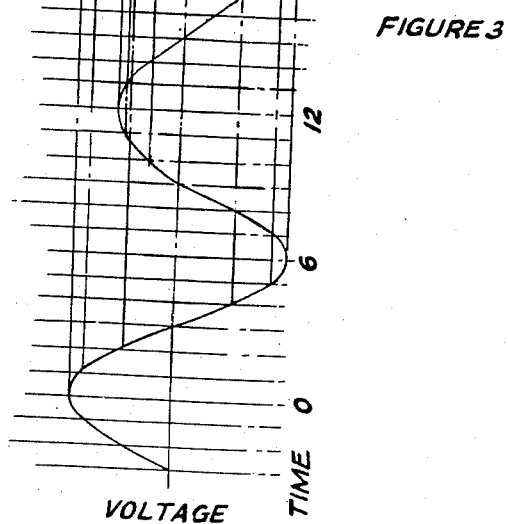
Figure 3 is a diagrammatic view showing the relationship of the alternating current waves impressed on the oscilloscope.

In Figure 3 the diagram shows how the different amplitude waves cooperate to produce the concentric paths 50 and 50A. If readings from three instruments are to be sent, another sending device is added and the angular extent of openings 52 and 53 reduced to 120 degrees, the widths being so proportioned that waves of three different amplitudes are transmitted in succession with the result that the cathode ray will trace three circles on the screen.

The relationship of disk 15 to disk 23 of Figure 1 is such that while slit 18 in disk 15 is transversing the upper half of its circle of rotation, a positive half wave of voltage is produced in photoelectric cell 25 by means of the serrations of disk 23 and while disk 15 is traversing the lower half of its circle of rotation, a negative half wave of voltage is produced by the photocell. The serrations on disk 23 have been chosen to produce six full waves of voltage during each revolution. Any other suitable relationship may be used. For six full waves of voltage, the speed of disk 23 must be one-sixth of the speed of disk 15.

It is to be understood that various changes may be made, especially in regard to the motor speeds employed and such other features that do not form part of the invention as claimed.

Figure 4:
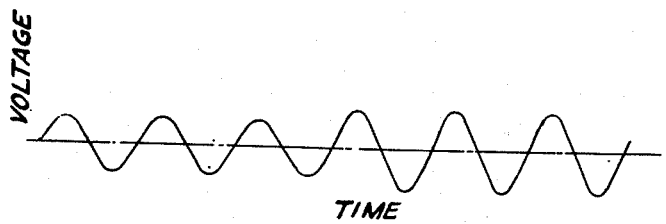
Figure 4 is a voltage diagram.

Particular attention is directed to the sending station apparatus illustrated in Figures 1 and 4, which forms the gist of this invention.

Shafts 16 are connected for synchronous operation by any suitable means preferably by means of synchronous transmitter 17a and motor 17 as shown.

Figure 6:
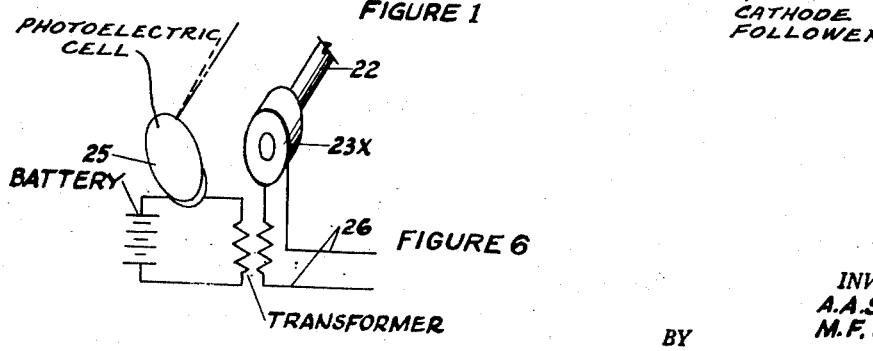
Figure 6 is a fragmentary diagram showing a slightly modified embodiment of the invention.

Disks 23, 23A and 23B are in effect electric current generators and may be replaced by suitable generators by making corresponding changes in the circuits, such as shown in Figure 6.

In Figure 6, a slightly modified form has been shown in which the generator employing disk 23 has been replaced by an alternating current generator 23X and in which the alternating circuit 26 is linked with the photoelectric cell by means of a transformer.

Figure 7:
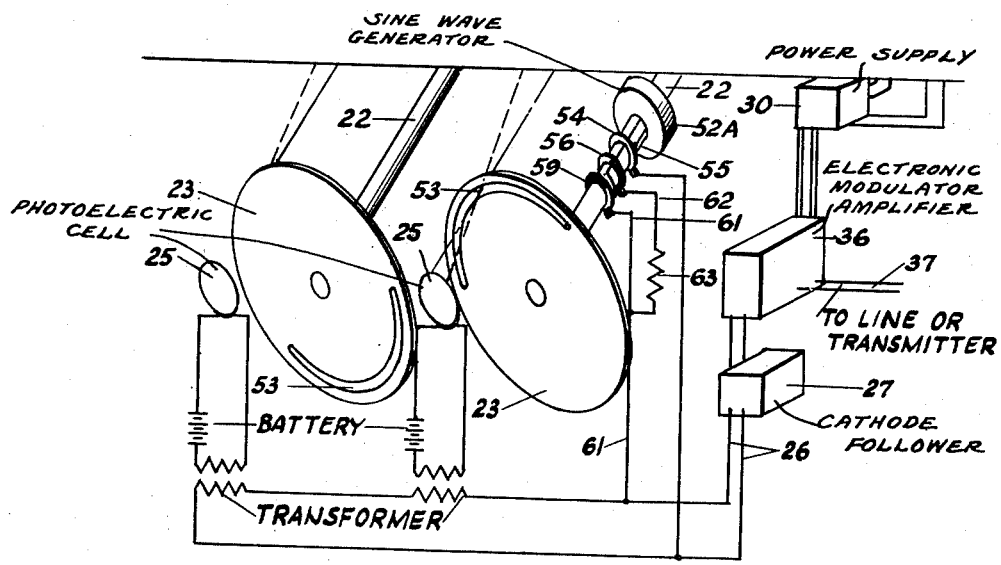
Figure 7 is a view similar to that in Figure 5 and shows a modified form of the invention.
Figure 8:
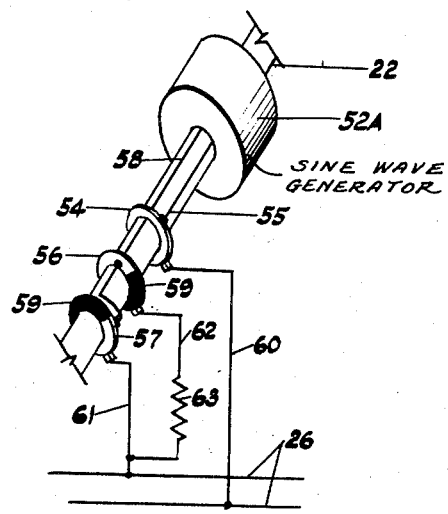
Figure 8 is a fragmentary view showing a detail of the construction.

It may be desirable, however, to modify the embodiment illustrated in Figure 5 in a manner similar to the modification of Figure 1 and this has been illustrated in Figures 7 and 8. The modification consists in omitting openings 52 from disks 23A and 23B, omitting also lamps 28, lenses 32A and slotted member 33, substituting a single sine wave generator 52A, securing the same to one of shafts 22. The armature winding has one end connected with slip ring 54 by wire 55 and the other end connected with slip rings 56 and 57 by means of wire 58. Slip ring 54 is made from conducting material throughout its entire circumference while slip rings 56 and 57 are each provided with insulating segments 59 extending 180° and oppositely positioned. Slip ring 54 is connected to one side of circuit 26 by conductor 60. Slip ring 57 is connected to the other side of circuit 26 by means of conductor 61. Slip ring 56 is connected to wire 61 by a conductor 62 in which is positioned a resistance 63. Due to the fact that slip rings 56 and 57 are each provided with an insulating segment 59 of 180° extent and oppositely positioned, current will flow alternately through wire 61 directly to circuit 26 and through resistance 63 to circuit 26. Due to the voltage drop in resistor 63 the voltage across line 26 will vary during each revolution of shaft 22 which gives the same result as that obtained by the generator shown in Figure 5 where the difference in voltage is the result of the difference in size of openings 52. Generator 52A is connected to shaft 22 in such a manner that it generates a positive half wave of voltage during the time slot 18 is traversing the upper half of its circle of rotation.

If readings from three instruments are to be reproduced at the receiving station current of three different voltage amplitudes must be produced and an additional slip ring added with corresponding changes in the value of the resistances 63. When an additional slip ring is added the conducting surface can extend only 120° and must be arranged to impress on circuit 26 three different voltages in succession.

Figure 9:
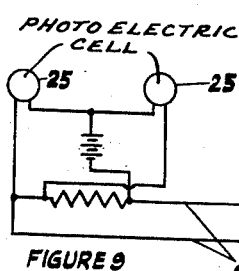
Figure 9 is a circuit diagram showing a specifically different circuit connection.

In the arrangement shown in Figure 7 each of the photocells has been shown as provided with a separate battery and a separate transformer linked with circuit wires 26. It is, of course, permissible to employ a circuit like that shown in Figure 9 in which the two photocells have a common battery and are connected in parallel with the same transformer primary. This may be carried forward to an installation containing three or more photocells because they function in sequence and only one at a time.

What is claimed as new is:

1. A telemetering device, comprising: a sending station having an instrument thereat with a pointer moveable relative to an instrument scale, means at the sending station for scanning the pointer and the scale, comprising a shaft mounted for rotation about an axis substantially coincident with the axis of the pointer, a disk secured to the shaft, the disk having a radial slit, means for rotating the shaft and disk, a photoelectric cell positioned in the line with shaft axis, on the opposite side of the disk from the pointer, a lamp positioned between the disk and the pointer, preferably in line with the axis of the pointer, a mirror carried by the pointer, angled to project light from the lamp onto the photoelectric cell through the slit in the disk, a mirror secured to the instrument at the end of the pointer scale, an alternating current generator driven in synchronism with the shaft, a channel of communication between the sending station and the receiving station, means including a cathode ray oscilloscope at the receiving station, arranged to trace a circular path on the screen in response to the alternating current generator at the sending station, and means for modulating the alternating current of the generator whenever light from either one of the mirrors strikes the photoelectric cell, to produce a deflection of the cathode ray thereby indicating on the screen the position of the pointer and the end of the instrument scale.

2. An apparatus in accordance with claim 1 in which the alternating current generator comprises a lamp spaced from the photocell, a disk positioned between the photocell, and the lamp and means for rotating said disk at a speed proportional to the speed of rotation of the first mentioned disk, the edge of the second mentioned disk being positioned to partly intercept the light from the lamp to the photocell and scalloped to vary the amount of light striking the photocell in accordance with the ordinates of a sine curve.

3. In a telemetering system having a scanning station and a receiving station, an apparatus for producing at the receiving station a plurality of indications of instrument pointer settings, each indication being coordinated with a point of reference, scanning means at the sending station for successively scanning a plurality of instrument fields, each field having therein a pointer having a mirror secured thereto, each field having a mirror mounted at one extremity of the pointer's range of movement, a shaft mounted for rotation about an axis substantially coincident with the pointer axis, a motor for rotating one of the shafts, means interconnecting the several shafts for synchronous rotation, each shaft having an opaque disk spaced from the instruments and provided with a radial slit, a lamp positioned between each disk and the corresponding instrument, arranged to illuminate the latter, a photoelectric cell positioned in the line of the axis of the shaft and on the opposite side of the disk from the instrument, the lamp, the mirror on the pointer and the photoelectric cell being so arranged that light from the lamp will be reflected and pass through the slit onto the photocell, once during each rotation of the disk, a shaft operatively connected with each of the first shafts for rotation at a fixed ratio about an axis parallel with the first shaft, an opaque disk on each of the second shafts so positioned and of such a diameter that it will intercept the light from the mirrors preventing it reaching the photocell, a lamp positioned on the opposite side of the last named disks from that on which the photocell is located, each disk having an arcuate opening of an angular extent not greater than three hundred and sixty degrees divided by the number of instruments, the several disks being so angularly related that light from only one instrument will strike a photocell at the same time, a second arcuate opening in each disk arranged to permit light from the last named lamp to strike the corresponding photocell, one edge of the arcuate opening being scalloped to vary the amount of light striking the photocell in accordance with a sine function, and means for transmitting current for the scanning devices to the receiving station.

ALFRED A. SWEENY.
MAURICE F. SWEENY.

REFERENCES CITED

The following references are of record in the file of this patent:

UNITED STATES PATENTS

| Number | Name | Date |
|---|---|---|
| 2,014,741 | Lesti | Sept. 17, 1935 |
| 2,208,376 | Luck | July 16, 1940 |
| 2,252,083 | Luck | Aug. 12, 1941 |
| 2,321,971 | Becker | June 15, 1943 |